Patented Aug. 20, 1935

2,011,607

UNITED STATES PATENT OFFICE 2,011,607

COLORED CALKING CEMENT

Charles S. Reeve, Leonia, N. J., assignor to The Barrett Company, New York, N. Y., a corporation of New Jersey No Drawing. Application January 21, 1932, Serial No. 587,968

3 Claims. (Cl. 106—8)

My invention relates to plastic compositions and cements and particularly to elastic cementitious materials adapted for use as calking cement and in expansion joints, etc. My invention is concerned particularly with colored calking cements.

In the construction of buildings it is usually necessary to employ a calking cement to seal the space between masonry and window frames, door frames, etc. to prevent the seepage of water into the structure and to avoid staining of the brickwork and the dampening and loosening of plaster within the building. Joints in masonry, roofs and roadways also are often filled with waterproof material to prevent water from penetrating to the foundation or lower layers of the construction. Many of these compositions are black and therefore unsuited for use in calking joints on the face of buildings where the dark color is objectionable. On the other hand, colored compositions employed as calking cements and the like ordinarily contain oxidizable oils which change in character on exposure, causing the composition to harden. When a substantial amount of oil is present in calking cement the brickwork or masonry is sometimes stained and in some instances the composition is too stiff to be readily applied, or when applied, it shrinks and cracks on exposure. Other compositions have been found to be so sticky and adhesive that they render it difficult to apply the same. However, the principal objection to compositions now in use is the lack of permanent elasticity necessary to provide a water-tight seal capable of expanding and contracting with the masonry or other structure to which the composition is applied.

I have found that certain resins and particularly paracoumarone resin, preferably in admixture with a solvent and preferably also combined with a filler such as asbestos or other fibrous material, are adapted for use as calking cement or sealing material for expansion joints and the like. The product of the present invention is characterized by permanent elasticity and resistance to oxidation and change upon exposure. Further, the product may be combined with a pigment adapted to give the composition the desired color for use on the face or other exposed portions of buildings, etc.

Among the objects of my invention are to provide a permanently elastic waterproof compound adapted for use as calking cement or the like, to improve the resistance of calking cements and calked joints to deterioration and leakage on exposure, to provide a colored calking cement adapted for use on the face of buildings or in other exposed locations, and to provide a simple and inexpensive method of producing compositions of the type described.

These and other objects and features of my invention will appear from the following description thereof in which reference is made to typical formulæ for producing calking cements. However, it will be apparent that the composition of my invention is adapted for many other uses and therefore the examples cited are intended to illustrate typical compositions and are not intended to limit the scope of the invention.

In producing calking cement in accordance with my invention, I employ a resin which preferably possesses elasticity at ordinary atmospheric temperatures and which is resistant to the action of acids and alkalies and substantially unaffected by exposure to the atmosphere.

The resin is preferably light in color and inexpensive to produce or obtain. Even resins of relatively dark color may be satisfactorily used in many cases, provided such resins have a low pigmental value, or when a very light colored cement is not required. As compared with asphalts and coal-tar pitches, which have a relatively high pigmental value, the color of such resins is easily masked by certain pigments although the resins themselves appear dark to the eye. Some of the darker colored grades of paracoumarone resins are examples of such resins. Resins of the type known commonly to the trade as "paracoumarone resins" are particularly adapted for this purpose. These resins are readily obtainable in varying grades having melting points ranging from about 40° C. or lower to above 100° C. and may be obtained in the form of light, almost colorless products. Paracoumarone resins are unsaponifiable and are extremely stable, undergoing no oxidation on exposure to the atmosphere and being unaffected by dilute acids. The type of resin employed in any instance may be varied, depending upon the character of the composition desired and the purpose for which the composition is to be used. Ordinarily for producing calking cements I employ paracoumarone resins having a melting point of from 50° to 60° C.

The resin is preferably mixed with a solvent for the resin which is employed in sufficient amount to produce a composition of any desired degree of plasticity, from a stiff putty-like mass to a mobile paste adapted to be applied by pressure apparatus. The solvent may be of a volatile type which evaporates from the material leaving a stable elastic waterproof cement, or I may employ a non-volatile solvent which remains in the composition after the same has been applied. A mixture of volatile and non-volatile solvents may also be used if desired. Among the solvents suitable for this purpose are volatile organic liquids such as xylol, benzol, or other organic derivative of coal tar. The non-volatile solvents may be high boiling organic liquids, such as coal tar distillates. In any case the solvent will vary in character and amount with the nature of the resinous material employed and the characteristics of the composition to be produced.

The composition preferably includes in addition to the resin and solvent a filler such as asbestos, wood pulp, cotton linters, textile fibers, or other comminuted fibrous material and may include inert pulverized or comminuted fillers.

Calking cements and the like embodying my invention are readily colored and therefore are particularly adapted for use in joints in exposed portions of buildings, etc. The composition may be given any desired color blending with the color of the masonry, brick, moldings or other portion of the structure to which the cement is applied by mixing a suitable pigment or coloring agent therewith, such as the metallic oxide pigments, iron oxide, zinc oxide, lead oxide, or other mineral pigments. The composition is free from black or dark colored materials such as pitch or dark colored bituminous materials, and therefore may be given light colors as well as darker shades, as desired, for any particular application depending upon the character of the pigment employed. The calking cement and joints to which the cement is applied, are therefore inconspicuous and the objectionable and unsightly appearance commonly presented by calked joints is overcome.

The materials may be mixed in various proportions to obtain cements having a wide range of different characteristics. Ordinarily, when the cement is to be applied by means of a trowel, the product is stiffer than that produced for application by means of a mechanical pressure device. Although I may use the resin by itself or in admixture with a solvent, the amount of resin preferably employed constitutes from 40 to 80 per cent by weight of the composition. The filler or fibrous material when used preferably does not exceed about 40 per cent of the total weight of the composition, and the amount of pigment employed will, of course, vary with the characteristics of the pigment and the color of the cement to be produced. Similarly the amount and character of solvent employed varies with the proportions of resin, fibrous material and pigment in the composition and with the characteristics of the resin used and the cement to be produced.

The product is preferably produced by melting the resin and mixing with solvent to produce a solution thereof. The fibrous material is then added to the mixture followed by the pigment in sufficient amount to give the desired color, and the whole mass thoroughly mixed or kneaded. If desired, a portion of the solvent may be used for dissolving the resin and additional solvent added during the mixing operation and the order in which the pigment and fiber are added may be varied as desired. The mixing of the resin solution with pigment and fibrous material may usually be accomplished at ordinary atmospheric temperature, although I may in some instances warm the material during mixing when the cement being produced is comparatively stiff.

The product obtained is free from water and oxidizable oils and therefore undergoes substantially no change or hardening after the volatile solvent passes off. The amount of solvent used and the properties of the composition are such that objectionable shrinking of the material does not take place. The cement remains permanently elastic and waterproof and is unaffected by exposure to the atmosphere.

*Example 1.*—A typical formula for producing red calking cement, which is adapted to be applied by means of a trowel, is as follows:

| | Percent |
|---|---|
| Paracoumarone resin (m. p. 50°–60° C.) | 59 |
| Solvent | 16 |
| Iron oxide | 4 |
| Asbestos | 21 |

*Example 2.*—A gray composition suitable for use as a calking cement has been produced using the following formula:

| | Percent |
|---|---|
| Paracoumarone resin (m. p. 50°–60° C.) | 70 |
| Solvent | 12 |
| Zinc oxide | 8 |
| Asbestos | 10 |

*Example 3.*—In some instances it may be desired to employ two or more pigments in order to obtain a cement having the desired color. Thus a green cement may be produced having the following formula:

| | Percent |
|---|---|
| Paracoumarone resin (m. p. 50°–60° C.) | 56 |
| Solvent | 15 |
| Chrome yellow | 7 |
| Ultramarine blue | 2 |
| Asbestos | 20 |

As indicated by the foregoing examples, the proportions of the materials may vary widely, depending upon the characteristics of the cement to be produced. Furthermore, resins other than paracoumarone resins and fillers or fibrous materials other than asbestos may be employed, if desired, and numerous other changes in the proportions and character of the constituents employed in producing the composition may be made without departing from the spirit and scope of the invention.

The term "elasticity" as applied to calking cements is generally understood in the trade to refer to the plastic as well as the elastic properties of the material. It is therefore considered that a product, which does not crack when subjected to deformation in ordinary use, possesses satisfactory elasticity. The terms "elastic" and "elasticity" are used throughout the specification and in the claims in the foregoing sense.

The term "color" is used in the specification and claims in a sense excluding black, which, strictly speaking is not a color.

I claim:

1. A weather-fast colored calking cement characterized by substantially permanent elasticity and adapted to be applied at atmospheric temperatures by a hand trowel or grease gun, said cement consisting of about 60 percent by weight of paracoumarone resin having a melting point from about 50° to about 60° C., about 20 percent asbestos fiber, about 5 percent metallic oxide and about 15 percent of xylol.

2. A weather-fast colored calking cement characterized by substantially permanent elasticity and adapted to be applied at atmospheric temperatures by a hand trowel or grease gun, said cement consisting of from 40 to 80 percent by weight of paracoumarone resin, less than 40 percent of comminuted fibrous material, a pigment and a sufficient amount of solvent for the resin to render the composition plastic at atmospheric temperatures.

3. A weather-fast calking cement adapted to be mixed with a pigment to impart the desired color thereto and to be applied at atmospheric temperatures by a hand trowel or grease gun and characterized by substantially permanent elasticity, said cement comprising from 40 to 80 percent by weight of paracoumarone resin of low pigmental value such that the pigment admixed therewith would mask the color of the resin, a minor proportion of comminuted fibrous material and a sufficient amount of solvent for the resin to render the composition plastic at atmospheric temperatures.

CHARLES S. REEVE.